Figure 1:
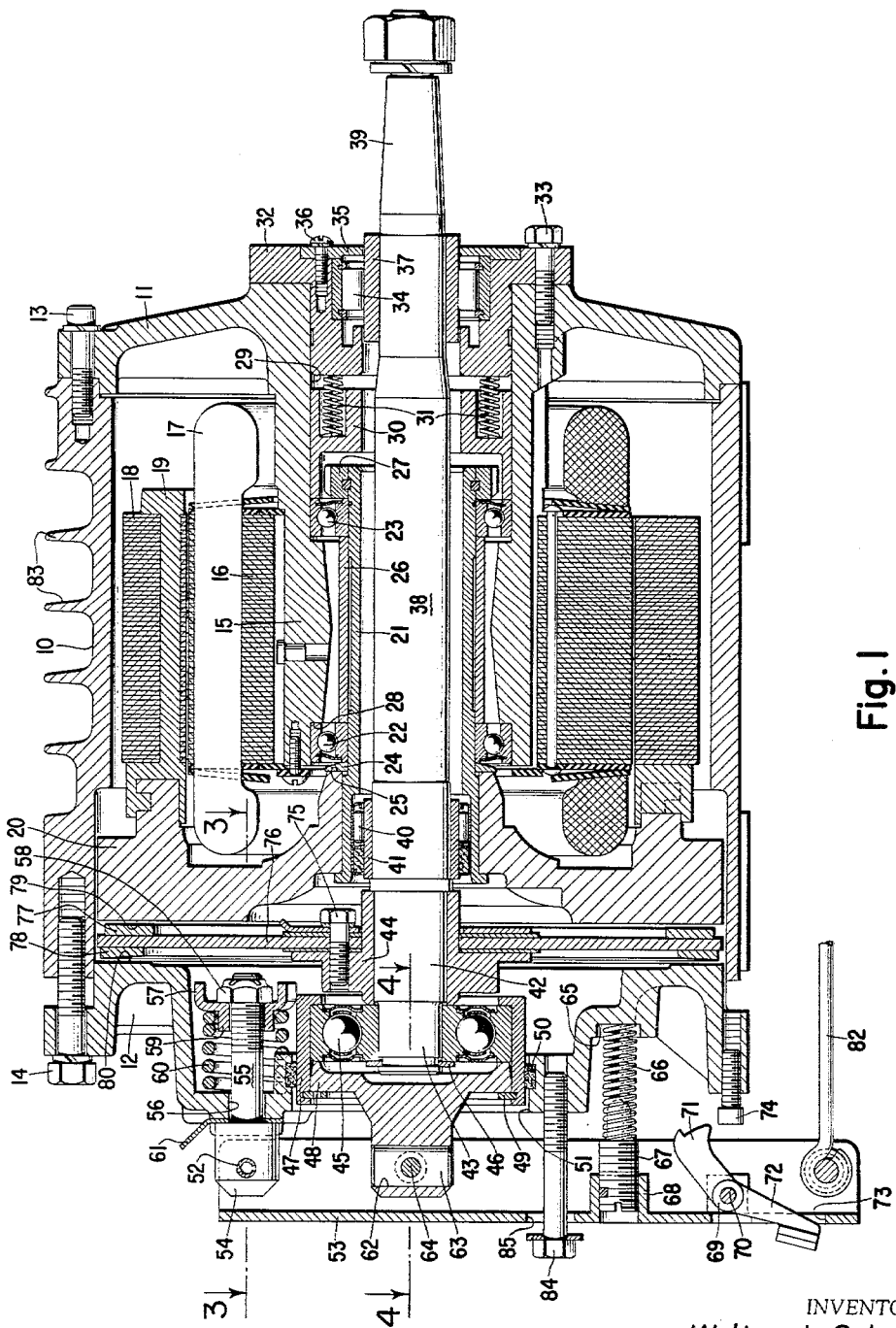

May 31, 1966 W. J. SCHEUERER 3,253,686
ELECTRIC CLUTCH-BRAKE MOTORS
Filed May 20, 1964 3 Sheets-Sheet 1

WITNESS

INVENTOR.
Walter J. Scheuerer
BY
ATTORNEY

May 31, 1966  W. J. SCHEUERER  3,253,686
ELECTRIC CLUTCH-BRAKE MOTORS
Filed May 20, 1964
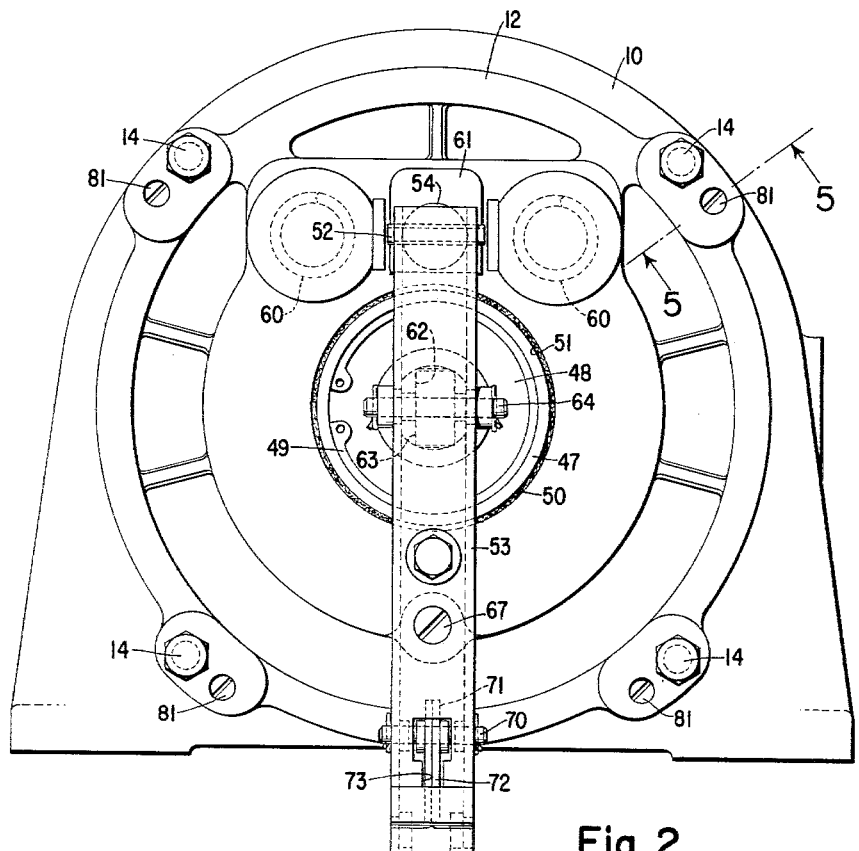
Fig. 2
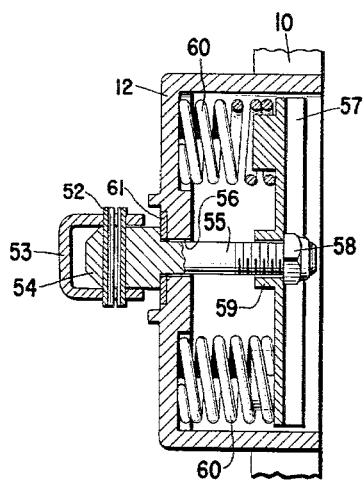
WITNESS  Fig. 3
William Martin Jr.
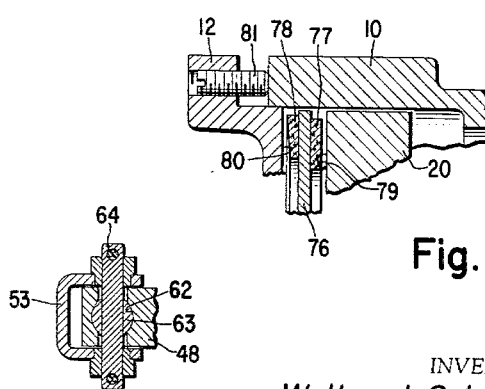
Fig. 5
Fig. 4
INVENTOR.
Walter J. Scheuerer
BY
Marshall J. Breen
ATTORNEY May 31, 1966   W. J. SCHEUERER   3,253,686
ELECTRIC CLUTCH-BRAKE MOTORS
Filed May 20, 1964   3 Sheets-Sheet 3

WITNESS
William Martins Jr

INVENTOR.
Walter J. Scheuerer
BY
Marshall J. Breen
ATTORNEY 3,253,686
ELECTRIC CLUTCH-BRAKE MOTORS
Walter J. Scheuerer, Califon, N.J., assignor to The Singer Company, New York, N.Y., a corporation of New Jersey
Filed May 20, 1964, Ser. No. 368,863
2 Claims. (Cl. 192—18)

This invention relates to electric clutch-brake motors for driving heavy machinery such as looms which must be repeatedly started and stopped. The invention relates more specifically to a heavy duty motor provided with an axially movable driven shaft and having special means for maintaining proper alignment between the driving and driven clutch elements to minimize clutch wear.

An object of this invention is to provide a heavy duty clutch-brake motor which maintains proper alignment between the driving and driven clutch elements under conditions of severe lateral thrust loads on the driven shaft.

A further object of this invention is to provide a clutch-brake motor in which the bearing for transmitting the thrust load to the clutch is not required to support any radial load for maintaining alignment of the driven shaft.

Another object of this invention is to provide a clutch-brake motor having the driven clutch element and clutch-operating mechanism removable from the motor as a unit for ease of servicing and independently of the bearings in which the driven shaft is journaled.

Other objects of the invention will be readily apparent when the following description is considered in connection with the accompanying drawings.

Figure 6:
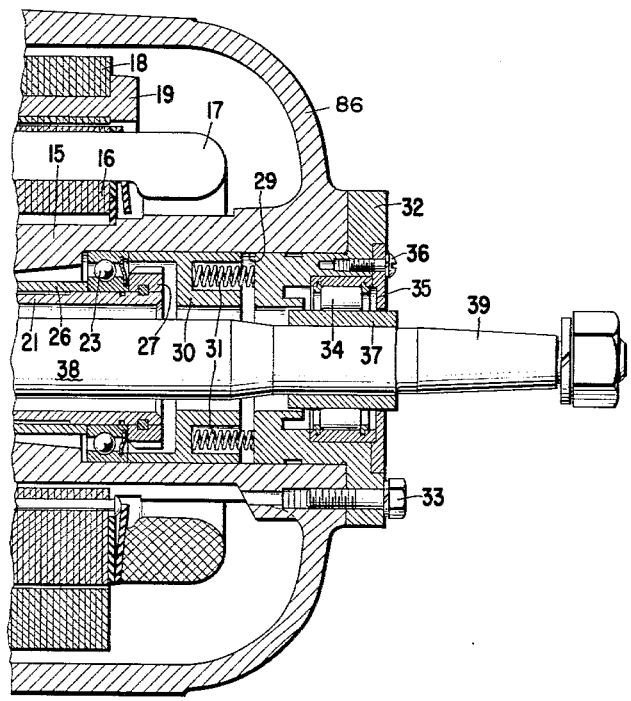

In the drawings:

FIG. 1 is a longitudinal sectional view taken through a clutch-brake motor illustrating an embodiment of this invention, FIG. 2 is a left end elevation of the motor of FIG. 1, FIG. 3 is a detailed sectional view taken on line 3—3 of FIG. 1, FIG. 4 is a detailed sectional view taken along the line 4—4 of FIG. 1, FIG. 5 is a detailed sectional view taken along the line 5—5 of FIG. 2, FIG. 6 is a partial longitudinal sectional view showing a modification of the embodiment of FIG. 1.

Referring more specifically to the drawings, a motor frame or casing is provided which includes a cylindrical housing 10, preferably of aluminum, and end closures 11 and 12, preferably of cast iron, and secured to the housing 10 by bolts 13 and 14 respectively, circumferentially spaced and tapped into the ends of the housing 10 as shown. A re-entrant tubular stator support 15 is formed integrally with the end closure 11 and extends into the housing 10 substantially concentrically with its cylindrical wall. The stator support 15 carries a laminated stator core 16 which is securely held in place on the support 15. A stator winding 17 is carried by the core 16 and is connected to a source of electric power (not shown).

A rotor core 18 surrounds the stator 16 and contains rotor conducting bars 19 cast integrally with a spider 20 secured for rotation with a tubular rotor shaft 21 which is journaled in bearings 22 and 23 carried by the stator support 15. The inner race of the bearing 22 seats against a thrust washer 24 seated against a thrust surface 25 formed on the spider 20. A spacing sleeve 26 extends between the inner races of the bearings 22 and 23 and a self-locking nut 27 is threaded onto the end of the shaft 21. The nut 27 can be drawn up securely because the spacing sleeve 26 transmits the force of the clamping action directly between the inner races without danger of damaging the bearings 22 and 23. The outer race of the bearing 22 abuts against shoulder 28 formed on the stator support 15. The outer race of the bearing 23 is slidable in a bore 29 in the end closure 11 and abuts against the end of a cup member 30 which is also slidable in the bore 29 and is preloaded by means of springs 31.

The springs 31 are seated against a flanged bearing cup 32 which is secured within the bore 29 by means of screws 33 tapped into the end closure 11. A counterbored portion of the bearing cup 32 receives the outer race of a roller bearing 34 secured by a cap 35, held in place by screws 36. An elongated inner race 37 for the bearing 34 is fitted tightly on a driven shaft 38 which is provided with a tapered portion 39 to receive a gear or pulley (not shown) for driving a machine (not shown) such as a loom.

The other end of the driven shaft 38 is journaled in a roller bearing 40 supported within the rotor shaft 21 at a location closely adjacent to the bearing 22. The inner race 41 for bearing 40 is elongated and fitted to the shaft 38 to provide a bearing surface similar to that of the inner race 37 so that the shaft is journaled for rotation and supported for limited endwise sliding movement relative to the stationary housing 10.

The preloading of bearing 23 by the springs 31 assures a division of the clutch thrust load between bearings 22 and 23 to obtain longer useful bearing life. This division of thrust works through the internal clearance in the rotor bearings 22 and 23. When the clutch is engaged, the initial force is transmitted through the inner race of bearing 22, through the spacer 26 to the inner race of bearing 23. This displaces the balls to bear on the outer race of the bearing 23 which is free to slide in the bore 29. The springs 31 then "see" the clutch force load until the internal clearance in bearing 22 is taken up, whereby further thrust load is transmitted through bearing 22. By selecting the size and/or number of springs 31, the clutch load may be proportioned between the bearings.

The driven shaft 38 is formed with a step portion 42 and a pilot portion 43 of reduced diameter. A hub 44 having a length slightly greater than the length of portion 42 is fitted thereon. The pilot portion 43 of the shaft 38 enters the inner race of a control bearing 45 and a snap ring 46 holds the inner race snugly against the end of the hub 44. The outer race of the control bearing 45 received within a bearing cup 47 is held in place by a control plate 48 secured by a snap ring 49. A soft felt ring 50 secured in a channeled aperture 51 in the end closure 12 forms with the bearing cup 47 a dust seal and has no support function inasmuch as the shaft 38 is entirely supported by the bearings 34 and 40.

A fulcrum pin 52 is secured to the upper end of an actuating lever 53 and extends through a journal hole in a fulcrum yoke 54 formed with a threaded stud portion 55 which passes through an aperture 56 in the end closure 12 and is secured to a fulcrum plate 57 inside the end closure 12 by a lock-nut 58. The fulcrum plate 57 carries two spring centering bosses 59—59 located on each side of the stud 55. A compression spring 60 surrounds each boss 59 and abuts against the plate 57 at one end and the end closure 12 at the other end. The springs 60 normally draw the fulcrum yoke 54 firmly against a feeler plate 61 inserted between the yoke 54 and the end closure 12. A slideway 62 is provided in the control plate 48 in which is positioned a trunnion block 63 pivotally fastened to the lever 53 by a pin 64. The lower portion of the end closure 12 is formed with a socket 65 which seats one end of a brake spring 66. The other end of the brake spring 66 embraces the reduced end of a brake adjusting screw 67 threaded into a boss portion 68 of the lever 53. A headed screw 84 passes through an aperture 85 in the lever 53 and is threaded into the end closure 12 and may be adjusted to establish a safe brake limiting position for the lever 53.

An inertia latch or snubber 69 is pivotally fastened to the lower end of the lever 53 by a pivot pin 70. The latch 69 comprises a latch finger 71 and a weighted tail portion 72 which swings freely through a slot 73 in the lever 53. An adjustable latch stop screw 74 is threaded into the end closure 12 where it can be engaged by the latch finger 71. This inertia latch or snubber structure is fully disclosed in the Turner United States Patent No. 2,889,855 issued June 9, 1959, and may be referred to for a complete understanding of its operation.

Secured to the hub 44 by means of circumferentially spaced tap screws 75 is a clutch disk 76 which carries on one face a friction clutch facing 77 and on the other face a friction brake facing 78. The clutch facing 77 is engageable with a smooth clutch surface 79 formed on the spider 20 and the brake facing 78 is engageable with a brake surface 80 formed on the interior of the end closure 12. The friction brake facing is tapered as shown to insure engagement on the outside diameter in spite of flexing of the disc 76. This increases the brake capacity by increasing the mean effective radius of the brake ring. The spacing of the end closure 12 from the housing 10 may be adjustably determined by means of set screws 81 as shown in detail in FIG. 5. This will of course determine the spacing clearance of the brake surface 80 on the end-closure 12 relative to the brake facing 78 and in the event of disassembly for servicing insures that the same spacing is retained when the parts are reassembled. This brake adjustment structure is essentially the same as that shown and described in the Turner United States Patent No. 2,717,967 issued September 13, 1955 and forms no part of the present invention.

From the above description it will be apparent that when the lever 53 is actuated, as by endwise motion of a connecting-rod 82, a thrust is transmitted through the control bearing 45, to the driven shaft 38 to move it endwise, thus, carrying the driven clutch disc 76 into clutch or brake engagement as described. The driven shaft 38, being journaled in widely spaced bearings 34 and 40 is held in accurate concentric alignment with respect to the rotor shaft 21. This minimizes the runout between the driving and driven clutch elements and results in longer useful clutch life. A particular servicing feature of the structure of this invention resides in the fact that the driven clutch element is removable for overhaul as a unit together with the clutch-operating mechanism and the driven shaft by simply removing the bolts 14 and withdrawing the clutch assembly, and this may be accomplished without disturbing the alignment of the bearings 34 and 40 so that no subsequent realignment is necessary. It will be understood that the diameter over the inner race 37 is slightly less than the diameter over the inner race 41 to permit the shaft 38 to be entirely withdrawn through the clutch end of the motor.

The embodiment of the invention shown in FIG. 1 comprises a three-part casing comprising an aluminum housing 10 cast with radiation fins 83 and cast iron end closures 11 and 12. The finned aluminum housing provides increased heat dissipation and permits a higher load rating of the motor for the same frame size.

The choice of cast iron for the end closures is dictated by their use as bearing supports with its requirement of wear resistant surfaces. However, where the increased rating of the three-part construction is not important, the housing 10 and the end closure 11 may be combined in one casting 86 of cast iron, as shown in FIG. 6, and a two-part casing results. Otherwise the structure is the same as shown in FIG. 1 and, for this reason, only a partial section is shown in FIG. 6.

Having thus described the nature of the invention, what I claim herein is:

1. An electric clutch-brake motor having a hollow casing, a stator secured in said casing, a tubular rotor-shaft journaled at both ends in said casing, a rotor secured to said rotor-shaft and having a driving clutch portion, a bearing supported on the interior of said rotor-shaft adjacent to said driving clutch portion, a driven shaft extending through said rotor-shaft and having one end journaled in said casing and the other end journaled for support solely in said rotor-shaft supported bearing, a driven clutch element secured to said driven shaft, a control bearing supported solely on the end of said driven shaft adjacent to the driven clutch element, a bearing cup embracing the driven shaft supported bearing and external means for moving said bearing cup to impart endwise motion to the driven shaft to cause the driven clutch element to drivingly engage the driving clutch portion of the rotor.

2. An electric clutch-brake motor having a hollow casing, a stator secured in said casing, a tubular rotor-shaft journaled at both ends in said casing, a rotor secured to said rotor-shaft and having a driving clutch portion, a bearing supported on the interior of said rotor-shaft adjacent to said driving clutch portion, a driven shaft extending through said tubular rotor-shaft and having one end journaled in said casing and the other end journaled for support solely in said rotor-shaft supported bearing, a driven clutch element secured to said driven shaft, a control bearing supported solely on the end of said driven shaft adjacent to the driven clutch element, and means exerting only an endwise thrust loading on said control bearing to impart endwise motion to the driven shaft to cause the driven clutch to drivingly engage the driving clutch portion of the rotor.

References Cited by the Examiner

UNITED STATES PATENTS

| | | | |
|---|---|---|---|
| 2,461,504 | 2/1949 | Turner | 192—18 X |
| 2,724,470 | 11/1955 | Wendel | 192—18 |
| 2,891,643 | 6/1959 | Turner | 192—18 |

DAVID J. WILLIAMOWSKY, *Primary Examiner.*

DON A. WAITE, *Examiner.*

B. W. WYCHE, III, *Assistant Examiner.*